June 2, 1953  K. G. ALTHEIDE  2,640,680
VARIABLE PITCH HYDRAULIC TRANSMISSION
Filed Sept. 2, 1948  3 Sheets-Sheet 3
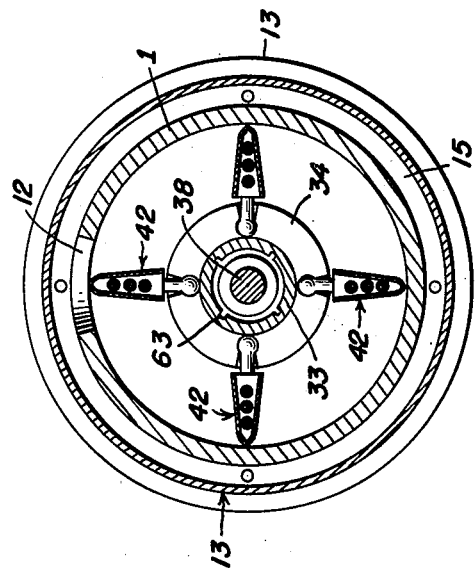
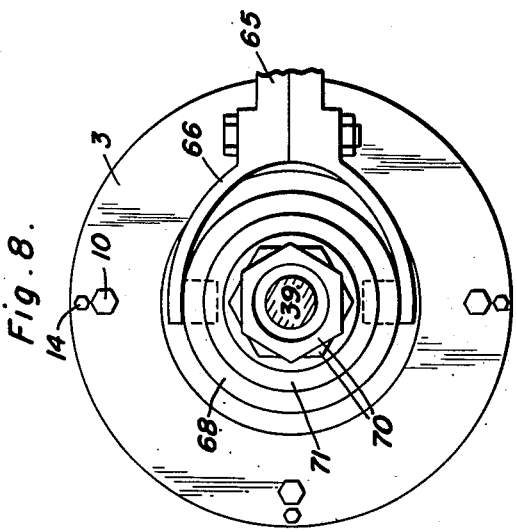
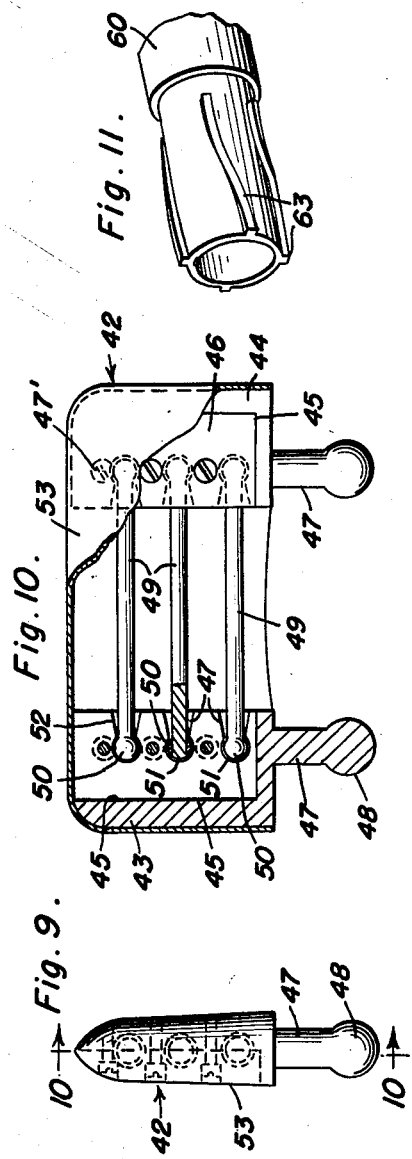
Kenneth G. Altheide
INVENTOR.

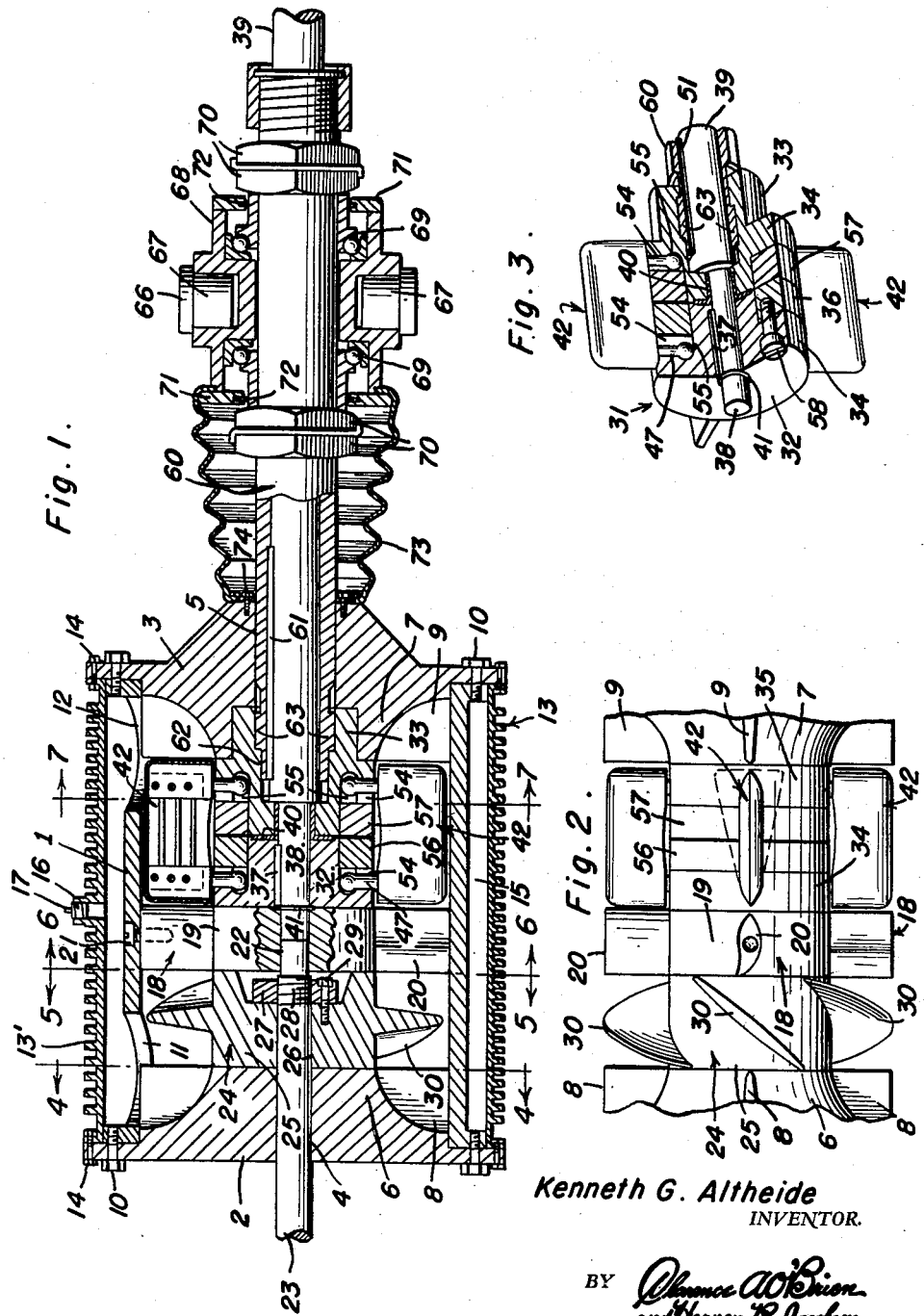

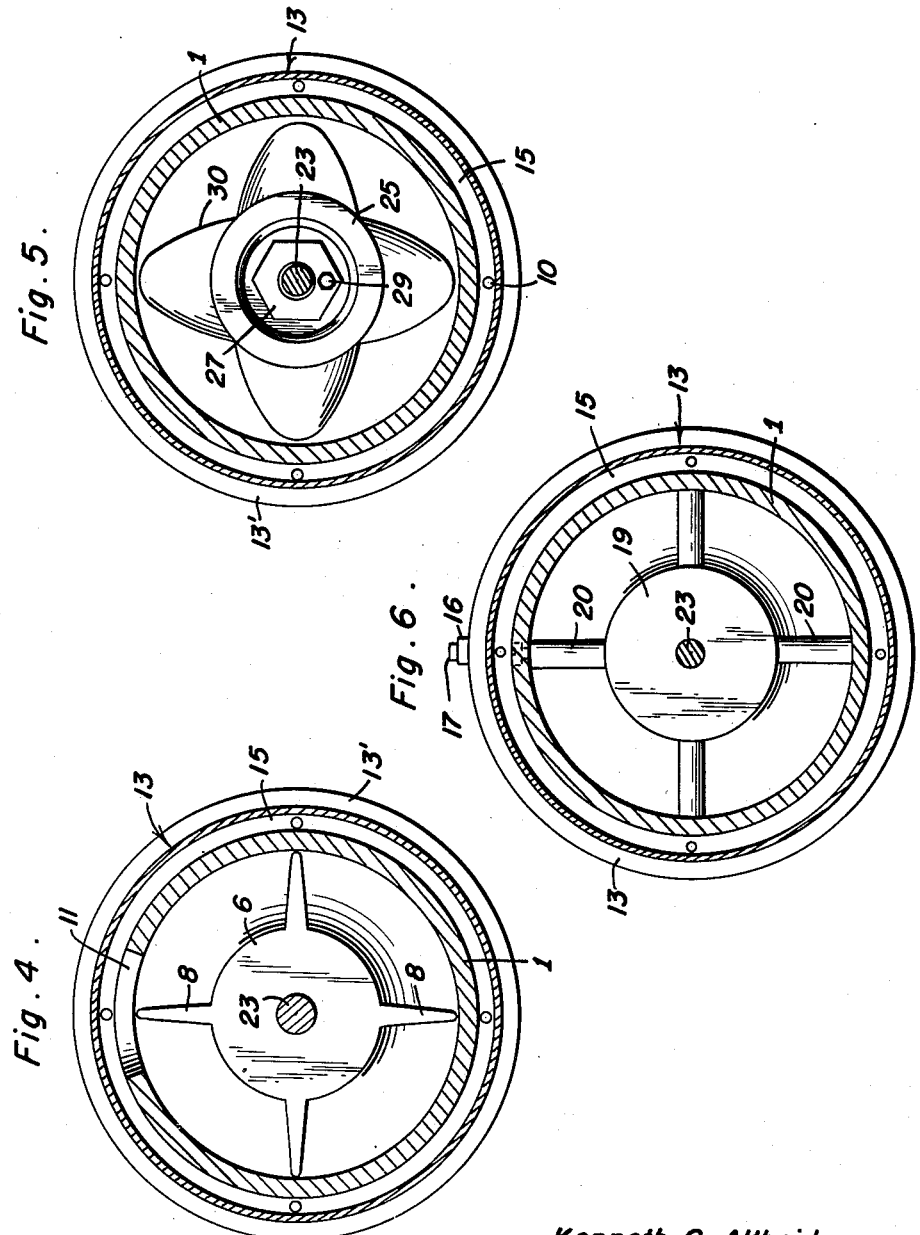

Patented June 2, 1953

2,640,680

UNITED STATES PATENT OFFICE 2,640,680

VARIABLE PITCH HYDRAULIC TRANSMISSION

Kenneth G. Altheide, Quincy, Ill.

Application September 2, 1948, Serial No. 47,505

4 Claims. (Cl. 253—142)

My invention relates to improvements in hydraulic transmissions of the turbine type.

The primary object of the invention is to provide a simply constructed transmission of the variable speed turbine type for use especially in the line of connection between an automobile engine and the propeller shaft of the automobile and which is constructed and arranged for varying the speed of the drive in a more efficient manner than hydraulic transmissions as commonly constructed.

Another object is to provide a hydraulic turbine type transmission having variable pitch rotor blades and improved means for mounting the blades and varying the pitch thereof.

Still another object is to provide in such a transmission improved means for causing a forced circulation of liquid in the transmission and preventing swirling of such liquid.

Other and subordinate objects, within the purview of my invention, together with the precise nature of my improvements will be readily understood when the succeeding description and claims are read with reference to the drawings accompanying and forming part of the specification.

In said drawings:

Figure 1 is a view in longitudinal section of my improved transmission in a preferred embodiment thereof;

Figure 2 is a fragmentary view in side elevation of the impeller and rotor;

Figure 3 is a fragmentary view in perspective of the rotor partly in section;

Figure 4 is a view in transverse section taken on the line 4—4 of Figure 1;

Figure 5 is a similar view taken on the line 5—5 of Figure 1;

Figure 6 is another similar view taken on the line 6—6 of Figure 1;

Figure 7 is another similar view taken on the line 7—7 of Figure 1;

Figure 8 is a view in rear end elevation partly in section;

Figure 9 is a view in end elevation of one of the rotor blades drawn to a larger scale;

Figure 10 is a view in longitudinal section taken on the line 10—10 of Figure 9;

Figure 11 is a fragmentary view in perspective of the speed control shaft.

Referring now to the drawings by numerals, my improved transmission comprises a generally cylindrical impeller and rotor casing 1 designed to contain oil and having front and rear end heads 2, 3 axially bored, as at 4, 5 and formed with axial, circumferentially concave hubs 6, 7 from which radiate stabilizing blades 8, 9 for preventing oil circulating through the casing 1 from swirling, at the ends of said casing. Bolts 10 secure the heads 2, 3 in place. A pair of top liquid inlet and outlet openings 11, 12 are provided in the casing 1 adjacent the front and rear heads 2, 3 and which are axially aligned substantially with the radial inner edges of the blades 8, 9 and are vertically aligned on one side of the axis thereof with the perimeter of the hubs 6, 7 for a purpose presently seen.

A cylindrical shell 13 surrounds the casing 1 between the heads 2, 3 and is bolted, as at 14, to said heads in spaced relation to the circumferential wall of the casing 1 to provide a chamber 15 for passing oil from the outlet opening 12 back to the inlet opening 11. The shell 13 is ribbed as at 13' for cooling purposes. A filler neck 16 on the shell 13 is closed by a plug 17.

A spider 18 is provided in the casing 1 diametrically thereof between the openings 11, 12 and comprises a hub 19 and radial twisted blades 20 bolted, as at 21, to said cylinder 1. The blades 20 serve as means intermediate the blades 8, 9 for preventing swirling of liquid in the casing 1. The hub 19 is axially bored, as at 22, for a purpose presently apparent.

The power shaft 23, which may be the crankshaft of an automobile engine, is journaled through the bore 4 of the front end head 2 with its inner end extending partway into and journaled in the bore 22 of the spider hub 19.

An impeller 24 is interposed between the hub 6 of the front end head 2 and the hub 19 of the spider 18 with a hub 25 rotatably fitted between said hubs 6, 19 and being axially bored, as at 26, to receive the power shaft 23. A lock nut 27 is recessed into the hub 25 and threaded on to the shaft 24, as at 28, and bolted to said hub 25, as at 29, to fix the impeller 24 to said power shaft. Suitably pitched blades 30 are provided on the hub 25 of the rotor 24 to force liquid rearwardly in the casing 1.

The rotor, designated generally by the numeral 31, is interposed between the hub 19 of the spider 18 and the hub 7 of the front end head 3. The rotor 31 comprises a pair of axially bored, axially aligned front and rear hub members 32, 33 of cylindrical form, the front hub member 32 having an end circumferential flange 34 and the rear hub member having a similar intermediate flange 35. The rear hub member 33 is journaled at one end in the hub 7 of the rear head 3. The front hub member 32 is keyed, as at 37, on a reduced front end 38 of a propeller shaft 39 journaled at said end in the bore 22 of the spider hub 19, the remainder of said shaft 39 extending rearwardly out of the casing 1. A flanged bearing sleeve 40 on the end 38 of said shaft 39 forms a liquid seal between said hub members 32, 33 and the propeller shaft 39. A sealing ring 41 on said end 38 forms a liquid seal between the spider hub 19 and the front hub member 32. As will be seen, the hub members 32, 33 are relatively rotatable. The front and rear hub members 32, 33 of the rotor 31 support a series of circumferentially spaced rectangular rotor blades 42 extending endwise along said hub members in substantially radial relation thereto.

The rotor blades 42 each comprise a pair of front and rear, substantially rectangular, end plates 43, 44 recessed, as at 45, in one and the same side thereof with keeper plates 46 seated in and secured in the recesses 45 by screws 47'. A stem 47 extends from one end of each plate 43, 44 with an end ball 48 thereon for a purpose presently seen. Longitudinal tie rods 49 connect the end plates 43, 44, and are spaced apart transversely of the blade 42 with ball ends 50 rotatable in round sockets 51 formed in said end plates 43, 44 in the bottoms of the recesses 45 and backs of the keeper plates 46, said sockets having flared mouths 52. Preferably there are three of the tie rods 49 with one rod adjacent each longitudinal edge of the rotor blade 42 and one rod intermediate the others and in the longitudinal center of the blade, although the number of intermediate rods may be increased if desired. One ball end 50 of the intermediate tie rod 49 is slidable thereon to provide a telescopic connection which, together with the ball ends 50 and the flared mouth sockets 52, provide for relative tilting of the ends 43, 44 of the blade 42 laterally and for limited rotation of the same relatively about the axes of the stems 47. A hood 53 of flexible material, preferably sheet rubber, covers the ends 43, 44 of each blade 42 and provides the surface of the rotor blade while yieldingly tying the ends 43, 44 of the blade together. The rotor blades 42 are mounted in the front and rear hub members 32, 33 of the rotor 31 by means of the stems 47 which are accommodated in open side slots 54 in confronting sides of the flanges 34, 35 of said members 32, 33, the slots being spaced circumferentially around said members 32, 33 and having enlarged, elongated, bottom sockets 55 extending endwise transversely of said flanges 34, 35 and in which the ball ends 48 of said stems 47 are confined so that said stems 47 are retained in the hub members 32, 33 but the stems 47 of each rotor blade 42 have limited sliding movement toward and from the ends of slots 54. A pair of spacing collars 56, 57 on the front and rear hub members 32, 33, intermediate the flanges 34, 35 close the slots 54 and are bolted to said members as at 58.

As will now be seen, if the rear hub member 33 of the rotor 31 is rotated relative to the front hub member 32, the end plates 43, 44 of the rotor blades 42 will be revolved about the axes of the stems 47 and the rear end plates 44 of said blades will be revolved sidewise relative to the front end plates 43 thereby swinging said blades about the axes of the stems 47 to pitch said blades 42 laterally into substantially spiral arrangement around the hub members 32, 33 and the described tie rods 49, the mounting of the stems 47, together with the flexible covering 53 will provide for compensating movement of the parts of the blades to permit such pitching in variable degree and in relatively opposite directions for forward and reverse rotation of the rotor 31 at different speeds. The hood 43 may be suitably bonded to the tie rods 49 and the sides bonded together between said rods.

A hollow speed control shaft 60 is journaled and endwise slidable in the bore 5 of the rear end head 3 with the propeller shaft 39 extending therethrough rearwardly out of the same and to which said shaft 60 is splined, as at 61, to be driven thereby. The front end of the speed control shaft 60 is journaled in a counterbore 62 in the rear hub member 33 of the rotor 31 and is endwise slidable in said bore. The front end of the speed control shaft 60 is splined to the rear hub member 33 of the rotor 31 by spiral fins 63 on said shaft arranged so that endwise sliding of said shaft 60 in opposite directions, in different degree, will correspondingly rotate the rear hub member 33 relative to the front hub member 32 to variably pitch the rotor blades 42 for variable speed drive of the propeller shaft 39 in opposite directions. As will be seen, in an intermediate setting of the speed control shaft 60, the rotor blades 42 are maintained in a neutral position in which the same are substantially parallel with the axis of the rotor 31 so that no drive to the propeller shaft 39 will occur.

For moving the speed control shaft 60 endwise, a forked shifter lever 65 is provided and pivoted in the usual manner, not shown, for swinging of the fork 66 thereof. The fork 66 is provided with rollers 67 working in a circumferentially grooved sleeve 68 surrounding the speed control shaft 60. The sleeve 68 is mounted on anti-friction bearings 69 on said shaft 60 interposed and confined between pairs of lock nuts 70 on said shaft 60. Sealing rings 71 suitably fixed on the ends of the sleeve 68 and carrying sealing washers 72 form dust seals between said sleeve 68 and said bearings 69. An accordion pleated, flexible guard 73 surrounds the speed control shaft 60 between the sleeve 68 and the rear end head 3 of the casing 1 and is suitably secured to one end of the sleeve 68 and to said head, as at 74.

The manner in which my described transmission operates will be readily understood from the foregoing and the following brief description of operations. With the casing 1 and chamber 15 filled with oil, not shown, if the power shaft 23 be driven, the impeller 24 will be rotated to cause the oil to flow past the rotor blades 42, the oil circulating through the casing and back to the impeller 24 by way of the outlet opening 12 and the inlet opening 11. In this connection, it is to be noted that the blades 30 are arranged to draw oil out of chamber 15 through the opening 14, as well as to force the same rearwardly in the casing under high pressure. The blades 8, 20 and 9 act to prevent swirling of the oil in the casing 1 at the ends of the casing and directly in front of the rotor 42 particularly. With the rotor blades 42 pitched, in the manner previously described, the oil will be forced against the sides thereof to rotate the rotor 31 at a speed and in a direction corresponding to the degree of pitch and the direction in which said blades are pitched laterally. Obviously, the propeller shaft 39 will be rotated in correspondence with the rotor 31 since the front hub member 32 of said rotor is keyed to said shaft. The speed control shaft 60 will also be rotated in correspondence with the rotor 31 since the rear hub member 33 of said rotor is splined thereto. The circumferentially concave hubs 6, 9 prevent the oil from pocketing between the blades 8, 9.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

Having described the invention, what is claimed as new is:

1. A rotor for a hydraulic transmission comprising a pair of coaxial hub members having confronting sides and one being rotatable relative to the other, elongated blades extending lengthwise alongside both hub members and each having a pair of separate end sections and means flexibly connecting each pair of end sections, one of the hub members being opposite one end section of each blade and the other hub member being opposite the other end section of the blade, and means on each end section and hub member opposite thereto pivotally and slidably connecting said sections to their opposite hub members for sliding movement longitudinally of the hub members and lateral swinging about individual axes radial to said hub members upon rotation of said one hub member relative to the other, whereby to impart a twisting action to said blades for varying the pitch thereof, and means to rotate said one hub member.

2. A rotor according to claim 1 wherein the end sections in each pair are spaced apart with confronting edges, and rods connect said confronting edges and being universally jointed thereto.

3. A rotor according to claim 1, said second named means comprising stems on said end sections having end balls thereon, said confronting sides of the hub member having recesses receiving said stems and end balls, with said stems substantially radial to said hub members.

4. A rotor for a hydraulic transmission comprising a pair of coaxial hub members one rotatable relative to the other, rectangular blades extending endwise longitudinally of the axes of said hub members and having separate flexibly connected end sections relatively movable laterally in opposite directions with respect to each other and pivotally and slidably connected to said hub members in substantially radial position relative thereto for lateral movement in opposite direction with respect to each other by rotation of said hub member relative to the other to variable pitch said blades with a twisting action, and means to rotate said one hub member relative to the other, said end sections comprising plates having stems thereon recessed into confronting sides of said hub members and extending substantially radially out of the same to pivotally and slidably connect said plates to said hub members, the plates of each blade being spaced part edgewise with confronting edges, and rods connected to said confronting edges and being universally jointed thereto.

KENNETH G. ALTHEIDE.

References Cited in the file of this patent

UNITED STATES PATENTS

| Number | Name | Date |
|---|---|---|
| 1,129,720 | Patterson | Feb. 23, 1915 |
| 1,279,742 | Mott | Sept. 24, 1918 |
| 1,456,699 | Kramer | May 29, 1923 |
| 1,840,148 | Berry | Jan. 5, 1932 |
| 1,993,741 | Jandasek | Mar. 12, 1935 |
| 2,309,899 | Hepperle | Feb. 2, 1943 |
| 2,382,034 | Wemp | Aug. 14, 1945 |
| 2,415,365 | Mudd | Feb. 4, 1947 |

FOREIGN PATENTS

| Number | Country | Date |
|---|---|---|
| 421,077 | France | Dec. 12, 1910 |